United States Patent
Maeda (10) Patent No.: US 8,161,406 B2
(45) Date of Patent: Apr. 17, 2012

(54) IMAGE PROCESSING DEVICE (75) Inventor: Tetsuya Maeda, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 435 days.

(21) Appl. No.: 12/283,690

(22) Filed: Sep. 15, 2008

(65) Prior Publication Data
US 2009/0089708 A1  Apr. 2, 2009

(30) Foreign Application Priority Data

Sep. 28, 2007  (JP) ................. 2007-254916

(51) Int. Cl.
G06F 3/048 (2006.01)
(52) U.S. Cl. ....................... 715/810; 358/1.13
(58) Field of Classification Search .................. 715/810
See application file for complete search history.

(56) References Cited

U.S. PATENT DOCUMENTS

| | | | |
|---|---|---|---|
| 6,744,424 B2 * | 6/2004 | Maeda et al. | 345/173 |
| 6,785,487 B2 * | 8/2004 | Maeda et al. | 399/81 |
| 2002/0015598 A1 * | 2/2002 | Maeda et al. | 399/81 |
| 2004/0239973 A1 * | 12/2004 | Tanaka et al. | 358/1.13 |
| 2009/0046057 A1 * | 2/2009 | Umezawa | 345/156 |
| 2010/0023856 A1 * | 1/2010 | Hoshino et al. | 715/274 |

FOREIGN PATENT DOCUMENTS

| | | |
|---|---|---|
| JP | 11-024511 | 1/1999 |
| JP | 2007-189525 | 7/2007 |

* cited by examiner

Primary Examiner — Tuyetlien Tran
Assistant Examiner — Anil Bhargava
(74) Attorney, Agent, or Firm — Jordan and Hamburg LLP (57) ABSTRACT An image processing device 100 includes a mode selection processing portion 50 capable of selecting a desired operational mode, a program registration processing portion 51 for storing in a program memory portion 57 the selected operational mode as a piece of program information, a program selection processing portion 52 capable of selecting a desired piece of program information from a plurality of pieces of program information stored in the program memory portion 57, a program call processing portion 53 for setting the operational mode on the basis of the piece of program information selected by the program selection processing portion 52, and a program information search processing portion 54 for searching a piece of program information from the plurality of pieces of program information stored in the program memory portion 57 on the basis of a piece of search key information corresponding to an individual operational mode.

5 Claims, 10 Drawing Sheets

IMAGE PROCESSING DEVICE

This application is based on an application No. 2007-254916 filed in Japan, the contents of which are hereby incorporated by reference.

BACKGROUND OF THE INVENTION

1. Field of the Invention

The present invention relates to an image processing device including a mode selection processing portion capable of selecting a desired operational mode from a plurality of operational modes, a program registration processing portion for storing in a program memory portion the operational mode selected by the mode selection processing portion as a piece of program information, a program selection processing portion capable of selecting a desired piece of program information from a plurality of pieces of program information stored in the program memory portion, and a program call processing portion for setting the operational mode on the basis of the piece of program information selected by the program selection processing portion.

2. Description of the Related Art

Multifunction photocopiers are an example of the image forming device and capable of selecting from a variety of operational modes including: image processing-related operational modes such as enlarge/reduce modes in which to enlarge or reduce the original image read by the scanner and lighten/darken modes in which to lighten or darken the original image when copied; image forming-related operational modes such as paper setting modes in which to set the paper drawer or the size and color of paper and simplex/duplex printing modes; and finisher of the output (e.g., stapling and punching). The term operational mode, as used herein, refers to one of the various selectable functions of the multifunction photocopier.

The operational modes need to be set by an operator every time they are necessary, which requires repetition of handling by the operator. This is not so much a problem when the setting is simple such as for the number of paper sheets to be copied or the size of paper, but becomes rather laborious when setting many operational modes at the same time such as specific zoom ratios and margin shift.

To address this inconvenience and in an attempt to improve the workability and convenience for the operator and eventually to prevent mishandling of the operator, the image forming devices including the multifunction photocopiers are adapted to be able to register in advance in the memory frequently used operational modes as program information.

Such image forming device greatly facilitates setting of desired operational modes by the operator even when they are complex operational modes; the operator may effect a calling operation of corresponding pieces of program information registered in the memory.

For example, Japanese Unexamined Patent Publication No. 11-24511 discloses a multi-mode image processing device including copy mode input setting means of inputting a plurality of copy modes for paper size, copy ratio, image editing, duplex copying, finisher, and the like, thus allowing for a copying operation in a copy mode input and set by the input setting means.

This image forming device further includes copy mode calling/registering means having two functions of calling and registering the copy mode set by the copy mode input setting means, and control means of switching between calling and registration of the program by the copy mode calling/registering means depending on the status of the image processing device.

However, when the image processing device registers therein numerous pieces of program information and the operator selects a desired piece of program information, the operator has to do the laborious work of finding out the desired piece of program information from among the registered numerous pieces of program information.

Specifically, when the image processing device lists on its display portion pieces of program information among which to select a necessary piece of program information, then the operator has to find out the desired piece of program information by visually checking the listings while manually changing pages for a new list or scrolling down the screen, occasionally ending up in more laborious work.

Usually, each of the registered pieces of program information is assigned an individual name for identification. However, if the operator forgets the name assigned to a desired piece of program information, it is almost impossible to select the piece of program information.

SUMMARY OF THE INVENTION

In view of the foregoing problems, an object of the present invention is to provide an image processing device that narrows down, by a simple operation, numerous stored pieces of program information to a piece of program information, thus easily selecting the desired piece of program information.

An image processing device according to the present invention includes: a mode selection processing portion capable of selecting a desired operational mode from a plurality of operational modes; a program registration processing portion for storing in a program memory portion the operational mode selected by the mode selection processing portion as a piece of program information; a program selection processing portion capable of selecting a desired piece of program information from a plurality of pieces of program information stored in the program memory portion; and a program call processing portion for setting the operational mode on the basis of the piece of program information selected by the program selection processing portion. The image processing device is characterized in including a program information search processing portion for searching a piece of program information from the plurality of pieces of program information stored in the program memory portion on the basis of a piece of search key information corresponding to an individual operational mode.

The present invention will become more apparent in the detailed description of the preferred embodiments presented below.

DESCRIPTION OF THE PREFERRED EMBODIMENTS

A multifunction photocopier according to an embodiment of the image processing device of the present invention will be described below.

Figure 2:
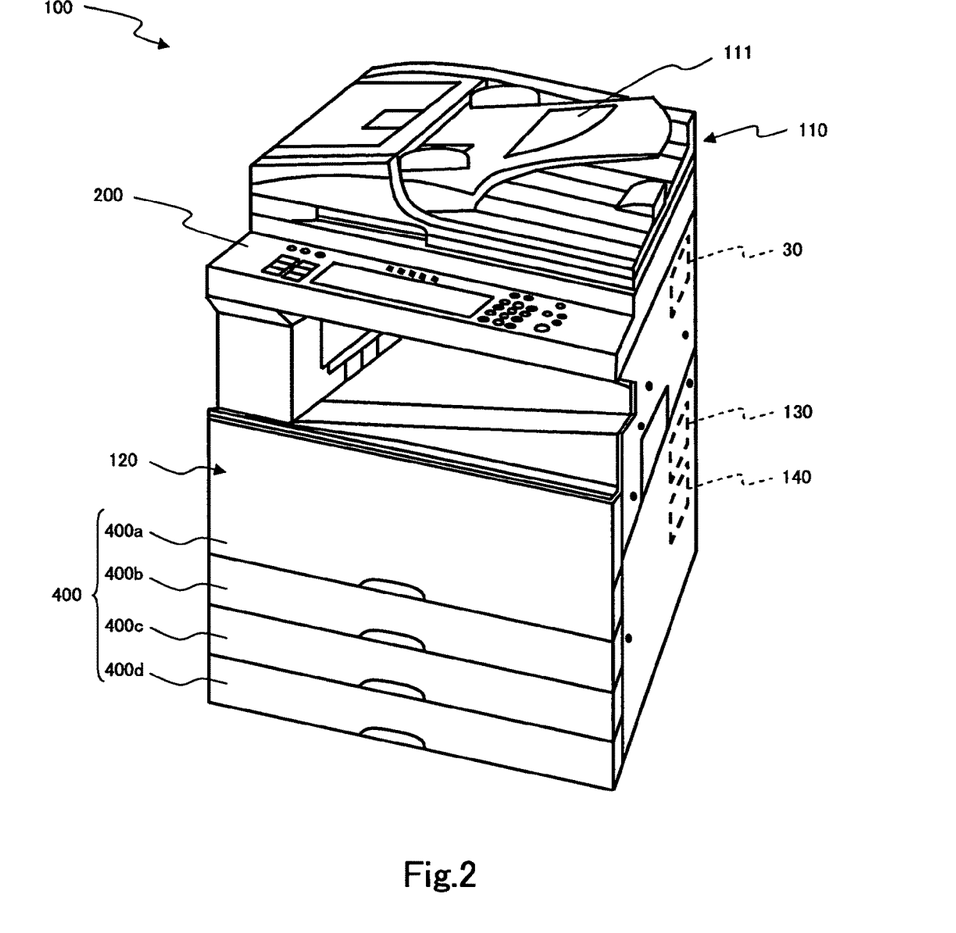
FIG. 2 is a functional block diagram of a color multifunction photocopier.

Referring to FIG. 2, an electro-photographic color multifunction photocopier 100 includes: functional blocks including an image reading portion 110, an image outputting portion 120, a network interface 130, a facsimile communication portion 140, and an operating portion 200 that serves as a man-machine interface; and a system control portion 30 (see FIG. 4) that assumes general control of the functional blocks.

The image reading portion 110 includes: an automatic document feeder that sequentially feeds sheets placed on a document feeding tray 111, an optical system including a light source that focuses light onto the document and a plurality of lenses and mirrors; an imaging element such as CCD that photoelectrically converts reflection light input from the document through the optical system into digital image data; and an image reading control portion 11 (see FIG. 4) that controls the foregoing to read the document image.

The image outputting portion 120 includes paper drawers 400, a plurality of photoreceptor units corresponding to the toner colors of magenta M, cyan C, yellow Y, and black K, a plurality of exposure devices that output modulated laser beams of the color components in accordance with the image data, a transferring portion that transfers the toner image formed on each of the photoreceptor units onto a sheet fed from the paper drawers 400, a fixing portion that fixes the transferred toner image on the sheet, and an image outputting control portion 12 (see FIG. 4) that controls the foregoing.

The photoreceptor units each include: a photoreceptor; and a charger, a developer, a cleaner, and a discharger, which are disposed over the circumference of the photoreceptor. The photoreceptor is uniformly charged by the charger and exposed to light from an exposure device to obtain an electrostatic latent image. The electrostatic latent image is turned into a visible, toner image by the developer, and the toner image is finally transferred onto the sheet.

The network interface 130 is a functional block connectable to personal computers through a LAN and composed of a network control portion 13 (see FIG. 4) including a micro computer disposed on a substrate. Image files are exchanged between the image forming device and personal computers through the network interface 130. The network interface 130 may have a mailer that enables exchange of digital image files attached to electronic mails between the photocopier and personal computers.

The facsimile communication portion 140 is a functional block that sends and receives image files by facsimile communication through a public line and composed of a communication control portion 14 including a micro computer disposed on the substrate.

Figure 3:
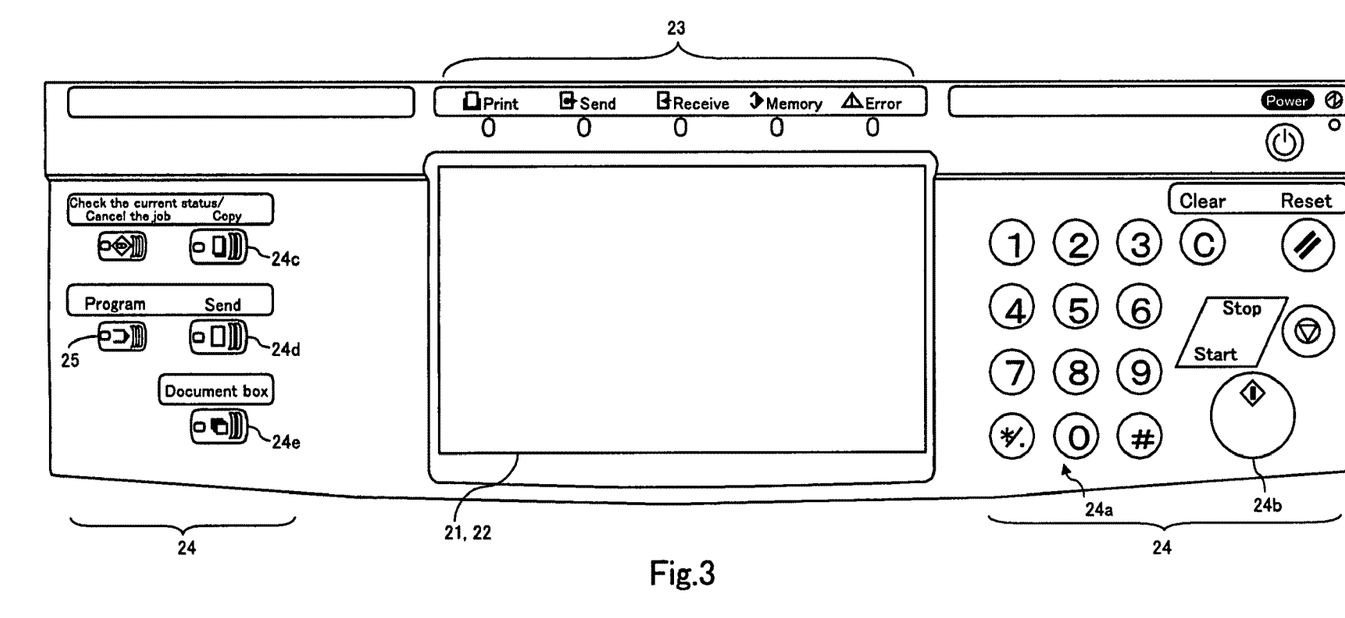
FIG. 3 is a diagram for illustrating an operating portion.

Referring to FIG. 3, the operating portion 200 includes a liquid crystal display portion 21, a touch panel 22 superimposed on the liquid crystal display portion 21, status indicating LEDs 23, operation keys including hardware keys 24, and an operating control portion 20 that controls the foregoing.

The liquid crystal display portion 21 displays operation keys including a plurality of software keys for setting the operational modes such as lighten/darken, copy ratio (enlarge/reduce), paper size, and duplex copy, and an operation display of an operational mode set through the software keys. When the touch panel 22 detects depressing of any of the software keys by the operator, the current operational mode is switched to one that corresponds to the depressed software key, and an operation display of the switched operational mode is shown.

The status indicating LEDs 23 include a copy lamp that lights during a copying operation and a send lamp that lights during sending by facsimile or electronic mail. Which LED is lighting or not notifies the operational status of the color multifunction photocopier 100.

The hardware keys 24 include numeric keys 24a, a start key 24b, a copy key 24c for setting the device to the copy mode, a send key 24d for setting the device to the facsimile sending mode or the electronic mail sending mode, a document box key 24e, and a program key 25 for executing program information registration or program information calling, described later.

The numeric keys 24a are used to set the number of copy sheets, the degree of lightness or darkness, and the like, the start key 24b is used to start copying, facsimile sending or electronic mail sending, and the like, and the document box key 24e is used to read or write digital image data from or to the document box, which is made of a large capacity hard disk or the like.

Figure 4:
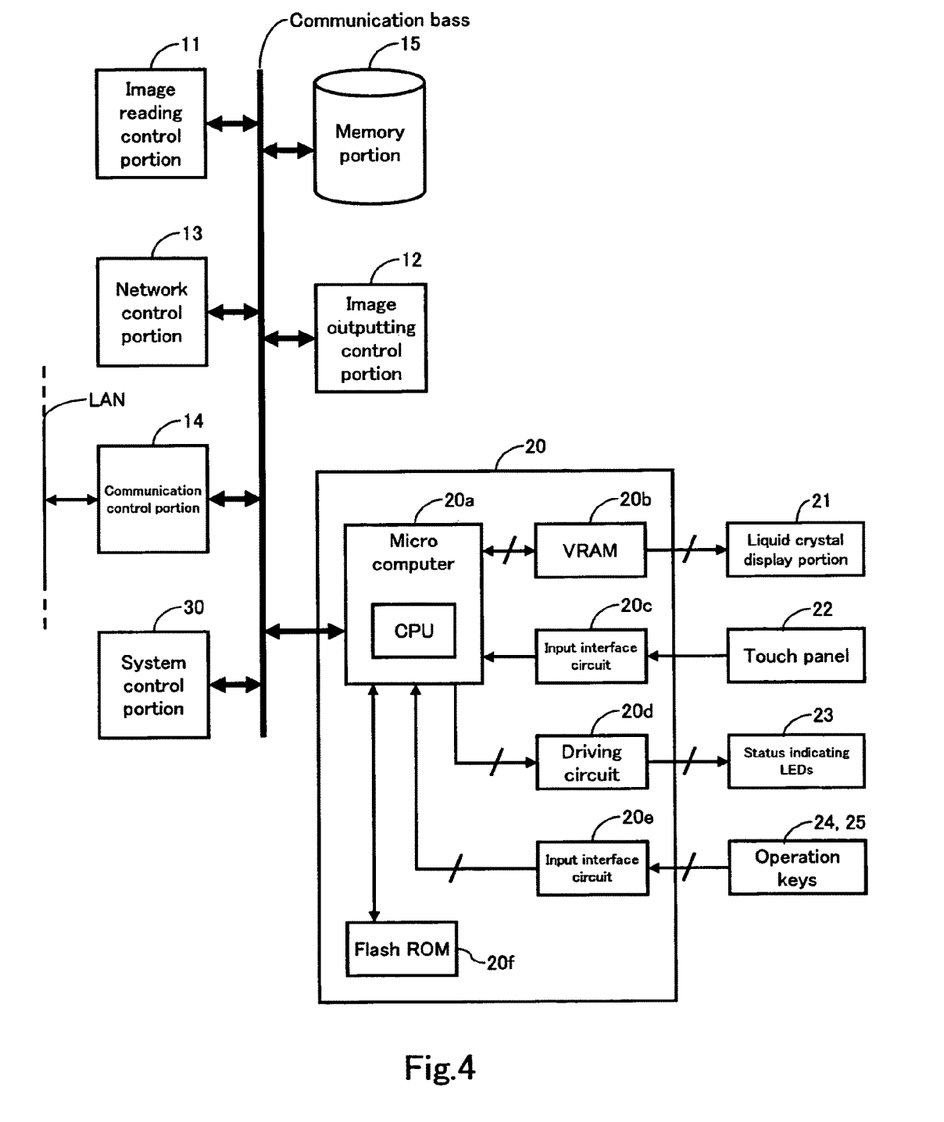
FIG. 4 is a diagram for illustrating the operation control portion.

Referring to FIG. 4, the image reading control portion 11, the image outputting control portion 12, the network control portion 13, the communication control portion 14, the operating control portion 20, and a memory portion 15 serving as the document box are connected to the system control portion 30 through a communication bus.

The system control portion 30 and the other control portions 11, 12, 13, 14, and 20 each have a micro computer with a memory therein such as ROM and RAM and a peripheral circuit. The above-described functional blocks are individually controlled by the control portions 11, 12, 13, 14, and 20 while the system control portion 30 generally controls the control portions 11, 12, 13, 14, and 20, thus collaboratively realizing a single function such as the copying function.

The operating control portion 20 includes a micro computer 20a, a VRAM 20b that develops display data shown on the liquid crystal display portion 21, an input interface circuit 20c for the touch panel 22, a driving circuit 20d for the status indicating LEDs 23, an input interface circuit 20e for the hardware keys 24, and a flash ROM 20f.

When any of the hardware keys 24 is depressed, the operating control portion 20 detects the depressed hardware key 24 through the input interface circuit 20e. When any of the software keys displayed on the operation display is depressed, the operating control portion 20 detects the depressed software key through the input interface circuit 20c. Then the operating control portion 20 outputs information about the detected operation key to the system control portion 30.

On the basis of a control signal from the system control portion 30, the operating control portion 20 causes the status indicating LEDs 23 to light or de-light through the driving circuit 20d while reading display data stored in the ROM and developing the display data to the VRAM 20b, which in turn causes the liquid crystal display portion 21 to show an operation display.

Figure 1:
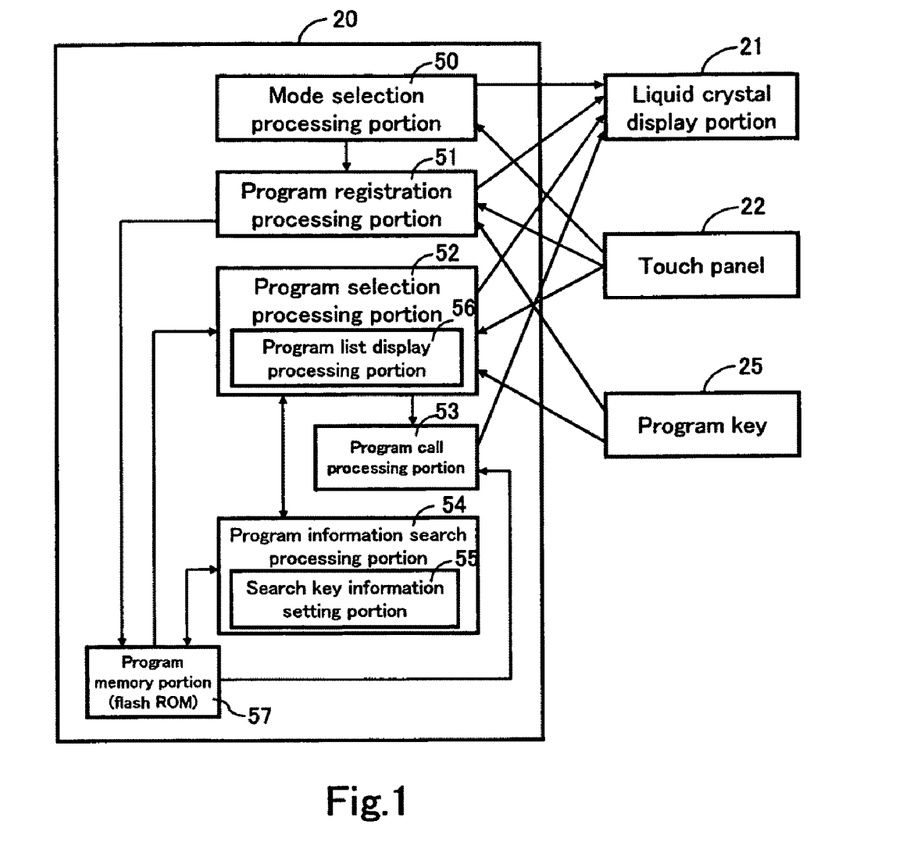
FIG. 1 is a functional block diagram of an operation control portion.

Referring to FIG. 1, the operating control portion 20 includes, as functional blocks related to the present invention, a mode selection processing portion 50, a program registration processing portion 51, a program selection processing portion 52, and a program call processing portion 53.

The mode selection processing portion 50 carries out, on the basis of a key operation by the operator, processing for selecting and setting a desired operational mode from operational modes such as lighten/darken, copy ratio (enlarge/reduce), paper size, and duplex copy.

The program registration processing portion 51 stores in a program memory portion 57 a combination of operational modes selected by the mode selection processing portion 50 as program information.

The program selection processing portion 52 carries out, on the basis of a key operation by the operator, processing for selecting a desired piece of program information from a plurality of pieces of program information stored in the program memory portion 57.

The program call processing portion 53 carries out processing for setting the operational mode of the device on the basis of the piece of program information selected by the program selection processing portion 52.

When the operator depresses the copy key 24c, the send key 24d, or the document box key 24e, then the system control portion 30 outputs control signals to the control portions to cause the color multifunction photocopier 100 to execute an operation corresponding to the depressed key.

Upon input of the control signals, the mode selection processing portion 50 causes the liquid crystal display portion 21 to show an operation display of an arrangement of software keys. The operation display is composed of a plurality of displays each with a tab to enable switching.

For example, when the copy key 24c is depressed, the liquid crystal display portion 21 displays software keys for setting various operational modes corresponding to the copy mode. When the send key 24d is depressed, the liquid crystal display portion 21 displays software keys for setting various operational modes corresponding to the facsimile sending mode or the electronic mail sending mode.

Each of the operational modes selectable by the mode selection processing portion 50 is set on the basis of a function implementable by the color multifunction photocopier 100 as a unit of setting, and by using a parameter with which the function can be set specifically. The operator can select a desired operational mode from the plurality of operational modes by depressing any of the software keys arranged on displays.

When the operator depresses a software key to select a desired operational mode, the mode selection processing portion 50 causes the liquid crystal display portion 21 to show a display or a list for specifically setting the function of the operational mode. The operator can use a parameter to specifically set the function of the selected operational mode by operating the display or the list.

The system control portion 30, upon receiving input of the operator-selected operational mode and its parameter from the mode selection processing portion 50, outputs control signals to the control portions and sets the color multifunction photocopier 100 to the operational mode to operate the color multifunction photocopier 100 in this mode.

Figure 5:
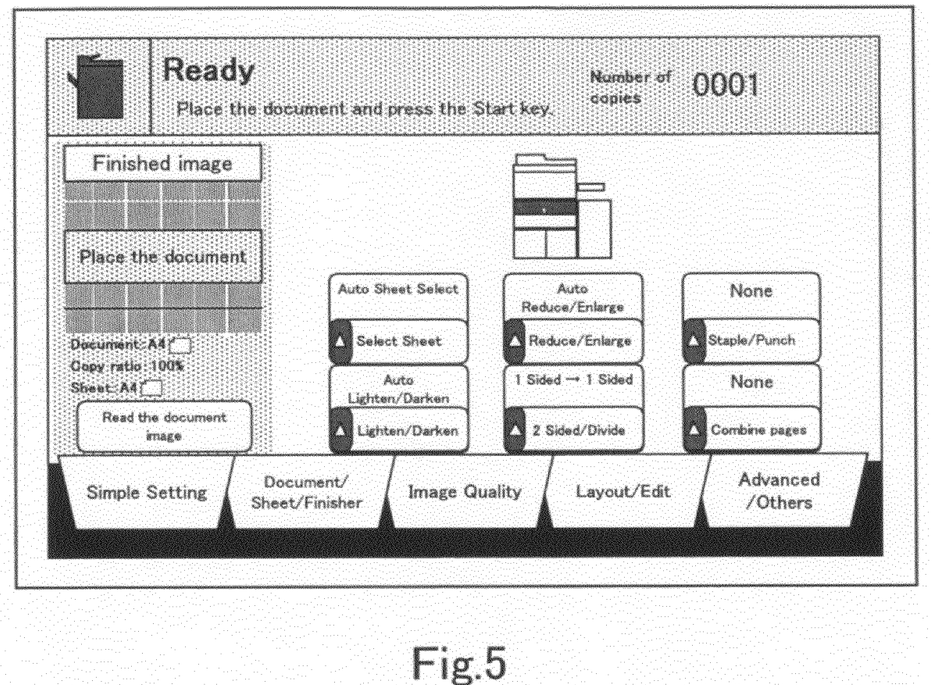
FIG. 5 is a diagram for illustrating an operation display that appears on the screen of the color multifunction photocopier when copying is carried out.

For example, referring to FIG. 5, in the copy mode, the mode selection processing portion 50 causes the liquid crystal display portion 21 to show an operation display composed of five displays with a "Simple Setting" tab, a "Document/Sheet/Finisher" tab, a "Image Quality" tab, a "Layout/Edit" tab, and an "Advanced/Others" tab.

The "Simple Setting" tab indicates a display for setting frequently used operational modes. The "Document/Sheet/Finisher" tab indicates a display for setting the operational modes for media type, paper size, and finisher.

The "Image Quality" tab indicates a display for setting operational modes related to image quality such as binary image and half-tone image. The "Layout/Edit" tab indicates a display for setting the operational modes for binding copying, combining multiple pages on one sheet, and the like. The "Advanced/Others" tab indicates a display for setting the operational modes for synthesized image, insert image printing, and the like.

For example, when the operator is setting the paper size and depresses the "Simple Setting" tab, keys including the paper size setting key are displayed. When the operator depresses the paper size setting key, a list of sizes of available sheets is displayed.

When the operator selects "A5" from the paper sizes in the list, the mode selection processing portion 50 outputs "A5" as a parameter in the operational mode of sheet setting to the system control portion 30. The system control portion 30 outputs to the image outputting control portion 12 a control signal for feeding a sheet of "A5" paper during copying.

Thus, the operator selects a desired operational mode by depressing a software key shown on the operation display, and sets a parameter that specifies the selected operational mode, thereby making it possible to operate the color multifunction photocopier 100 in the desired operational mode.

When, however, there are parameters that specify a plurality of operational modes, the operator has to set these parameters individually on every copy occasion, result in laborious setting work.

In view of this, the color multifunction photocopier 100 is adapted to enable the operator to quickly set the desired operational mode without laborious setting work. Specifically, the color multifunction photocopier 100 registers in advance, as program information, a combination of a plurality of operational modes individually set on the operation display and corresponding parameters, and enables the operator to call the program information when necessary.

Figure 6A:
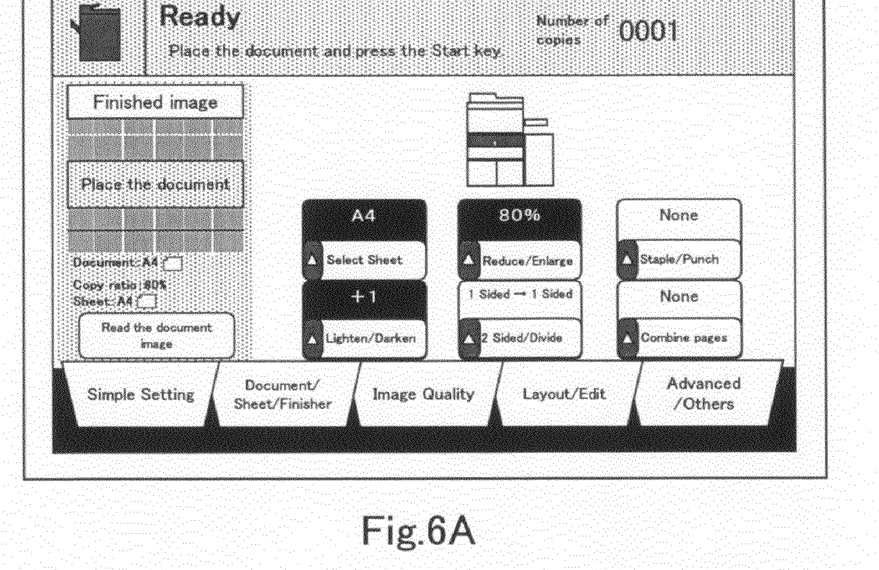
FIG. 6A is a diagram for illustrating an operation display that appears on the screen of the color multifunction photocopier when copying is carried out.

Referring to FIG. 6A, when the operator selects any of the software keys for operational mode setting shown on the operation display and sets a parameter that specifies the selected operational mode, then the mode selection processing portion 50 causes the selected software key to be displayed in a black-and-white reversed manner and the operator-set parameter to be displayed over the software key.

Figure 6B:
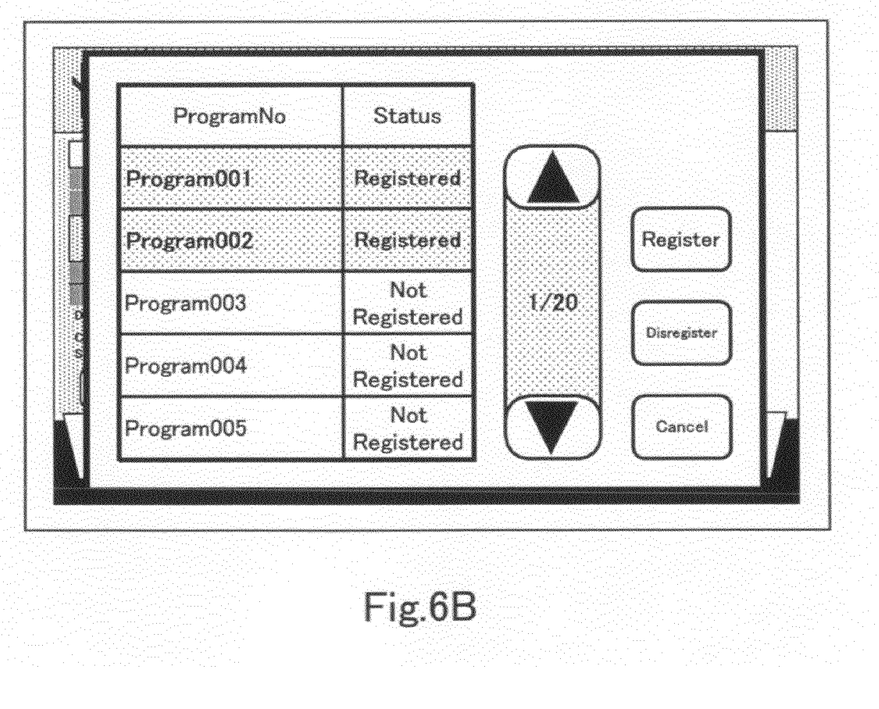
FIG. 6B is a diagram for illustrating an operation display that appears on the screen during program information registration.

When the operator depresses the program key 25 on the operating portion 200 with one or a plurality of software keys displayed in a black-and-white reversed manner, then the program registration processing portion 51 causes the liquid crystal display portion 21 to show a display for program information registration, as shown in FIG. 6B.

The "Program No.", ranging from "001" to "100", is prepared in advance and imparted to program information. The program registration processing portion 51 renders a piece of program information related to the set operational mode correspond to an operator-set "Program No." and stores this combination in the flash ROM 20f. That is, the flash ROM 20f constitutes the program memory portion according to the present invention.

While in the present embodiment a hundred kinds of program information are set to be registrable in the color multifunction photocopier 100, the number of kinds of program information is not limited to a hundred but is set in accordance with the capacity of the flash ROM 20f.

In the left half of the operation display for program information registration, a list is shown for indicating whether a piece of program information corresponding to a "Program No." is "Registered" or "Not Registered."

Figure 7A:
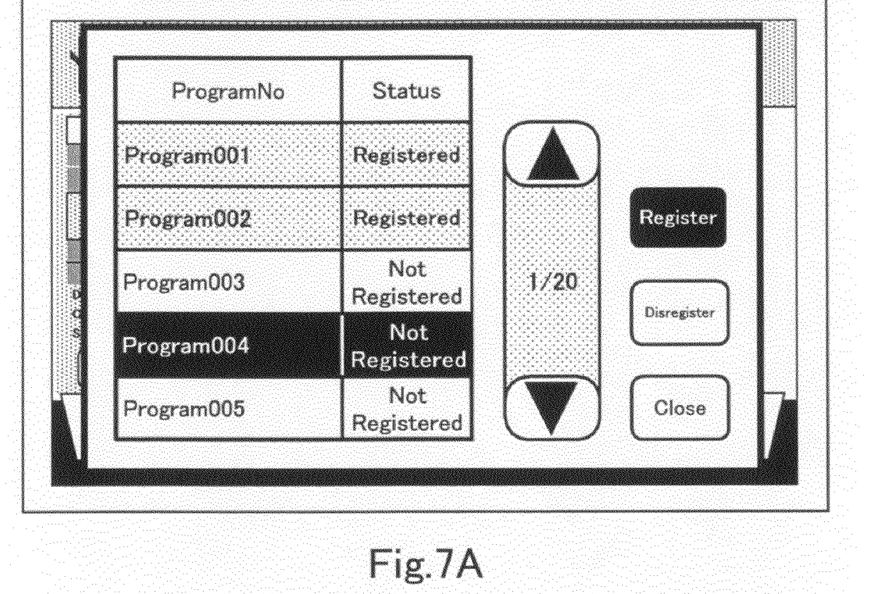
FIG. 7A is a diagram for illustrating an operation display that appears on the screen during program information registration.

Referring to FIG. 7A, when the operator depresses a "Program No." on a row of the list where the "Status" is "Not Registered," and depresses the "Register" button shown in the right half of the operation display, then the program registration processing portion 51 causes the piece of program information and the "Program No." to correspond to one another and be stored in the program memory portion 57. The program information includes code data indicating the operator-set operational mode and code data indicating a parameter of the operational mode.

Figure 7B:
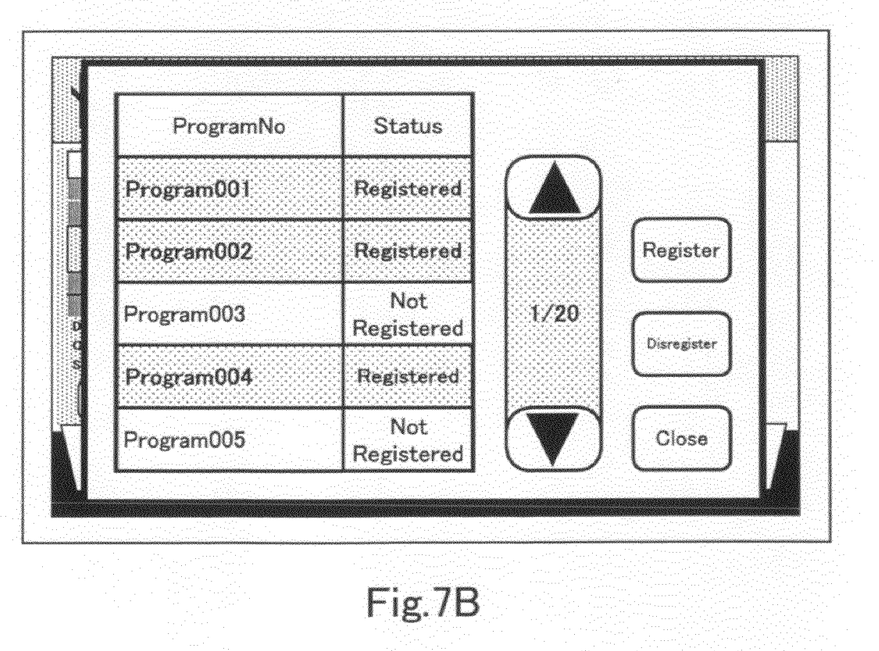
FIG. 7B is a diagram for illustrating an operation display that appears on the screen during program information registration.

Then, referring to FIG. 7B, the "Status" of this "Program No." is displayed in the list as "Registered."

Figure 8:
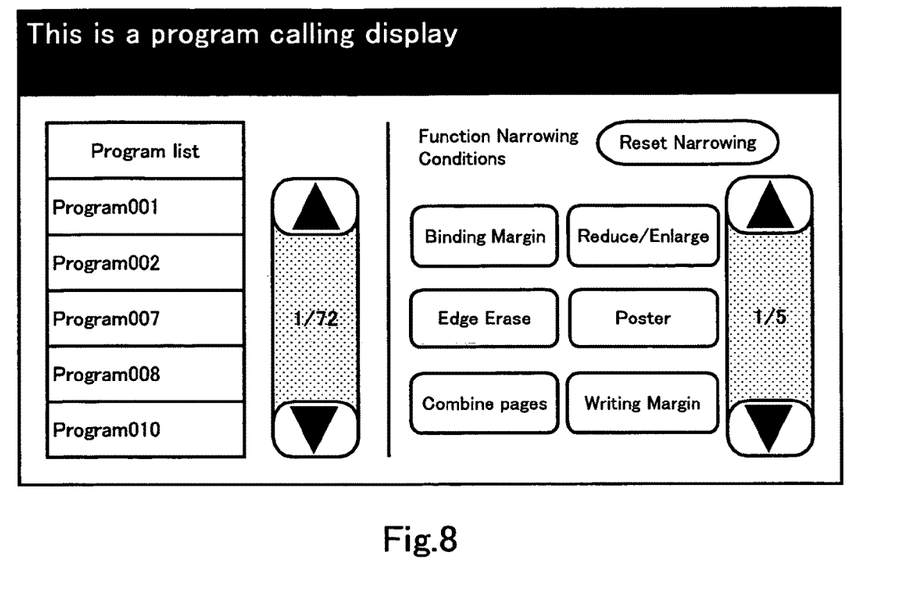
FIG. 8 is a diagram for illustrating an operation display that appears on the screen during program information calling.

When the operator depresses the program key 25 on the operating portion 200 with none of the software keys for operational mode setting selected, then the program selection processing portion 52 causes the liquid crystal display portion 21 to show an operation display for program information calling, as shown in FIG. 8.

The program selection processing portion 52 includes a program list display processing portion 56 for displaying a program list that corresponds to the pieces of program information stored in the program memory portion 57 and allows the pieces of program information to be selected therefrom (see FIG. 1).

In the left half of the operation display for program information calling, the program list display processing portion 56 shows a program list of the "Program Nos." that are made to correspond to the pieces of program information stored in the program memory portion 57.

When the operator depresses the "Program No." of a piece of program information in the program list, the program call processing portion 53 calls the desired operational mode and its parameter stored in the program memory portion 57 as the piece of program information corresponding to this "Program No.," and the program selection processing portion 52 sets the operational mode corresponding to the piece of program information and shows the operational mode on the operation display.

Then the program call processing portion 53 outputs the parameter that specifies the desired operational mode to the system control portion 30, which in turn outputs control signals to the control portions, thereby operating the color multifunction photocopier 100 in the operational mode that the operator desires.

Incidentally, if the number of pieces of program information increases in the program memory portion 57, the selecting operation for calling the desired piece of program information becomes laborious; if a "Program No." is erroneously selected, the color multifunction photocopier 100 might carry out an operation such as copying in an operational mode different from the desired operational mode. In addition, if the operator forgets the "Program No." of the desired piece of program information, it becomes difficult to call the piece of program information.

In view of this, the color multifunction photocopier 100 includes a program information search processing portion 54 for searching a piece of program information from a plurality of pieces of program information stored in the program memory portion 57 on the basis of a piece of search key information corresponding to an individual operational mode. This enables the operator to narrow down the plurality of pieces of program information stored in the program memory portion 57 to the desired piece of program information.

The program information search processing portion 54 includes a search key information setting portion 55 capable of creating an optional piece of search key information corresponding to an operational mode. The search key information setting portion 55 creates a piece of search key information corresponding to an operational mode on the basis of a function as a unit of setting.

Referring to FIG. 8, in the right half of the operation display for program information calling, the search key information setting portion 55 shows software keys, which are search keys each set on an operational mode basis.

Figure 9A:
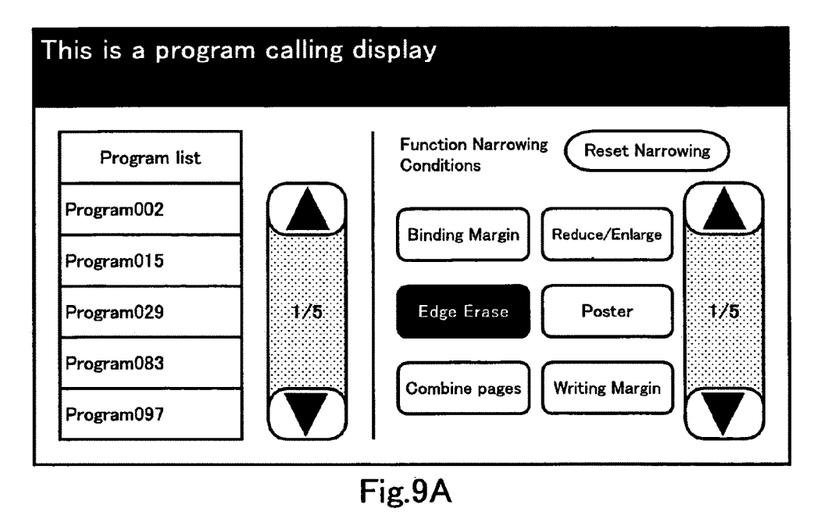
FIG. 9A is a diagram for illustrating an operation display that appears on the screen during program information calling.
Figure 9B:
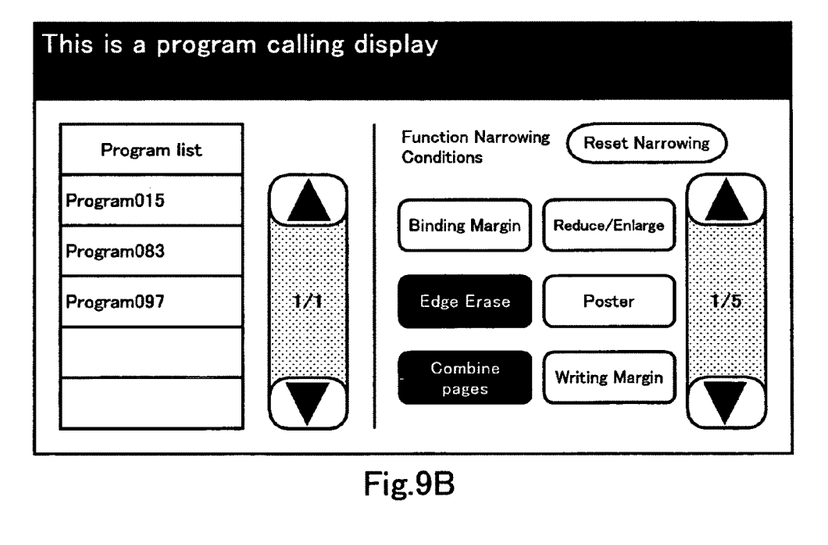
FIG. 9B is a diagram for illustrating an operation display that appears on the screen during program information calling.

Referring to FIGS. 9A and 9B, when the operator depresses a search key, the search key information setting portion 55 displays this search key in a black-and-white reversed manner.

Also the search key information setting portion 55 creates, on the basis of the operational mode corresponding to the search key, a piece of search key information corresponding to the operational mode of the piece of program information stored in the program memory portion 57.

Also in the right half of the operation display for program information calling, a software key for "Reset Narrowing" is shown.

When the operator depresses this software key, the search key information setting portion 55 clears the created piece of search key information while at the same time returning the display status of the operator-depressed search key to the initial status.

The program information search processing portion 54 searches, on the basis of the piece of search key information created by the search key information setting portion 55, a piece of program information corresponding to an individual operational mode from a plurality of pieces of program information stored in the program memory portion 57, thus enabling narrowing down of the program information selectable by the operator.

The program list display processing portion 56 updates the program list in accordance with the result of the search by the program information search processing portion 54 and displays the updated program list allowing the result of the search to be selected therefrom.

For example, referring to FIG. 9A, when the operator depresses a software key corresponding to the operational mode of edge erase, the search key information setting portion 55 creates a piece of search key information corresponding to the operational mode of edge erase, and the program information search processing portion 54 carries out narrowing down of the program information stored in the program memory portion 57.

Then the program list display processing portion 56 updates the program list to include the "Program No." of the piece of program information for the operational mode of edge erase and displays the updated program list.

Referring to FIG. 9B, when the operator further depresses a software key corresponding to the operational mode of combining multiple pages on one sheet, the search key information setting portion 55 creates a piece of search key information corresponding to the operational mode of combining multiple pages on one sheet, and the program information search processing portion 54 carries out narrowing down of the program information including the operational mode of combining multiple pages on one sheet.

Then the program list display processing portion 56 updates the program list to include the "Program Nos." of the pieces of program information for the operational mode of edge erase and the operational mode of combining multiple pages on one sheet, and displays the updated program list.

Other embodiments of the present invention will be described below.

While in the above embodiment the search key information setting portion 55 creates a piece of search key information corresponding to an operational mode on a function basis, the piece of search key information may be created on the basis of a parameter that specifies the function of the operational mode.

Although this elongates the time for searching the program information by the program information search processing portion 54, the narrowing down will be based on a more stringent condition, which enables the operator to much more easily select the desired piece of program information from the displayed program list updated on the basis of the search result.

Figure 10A:
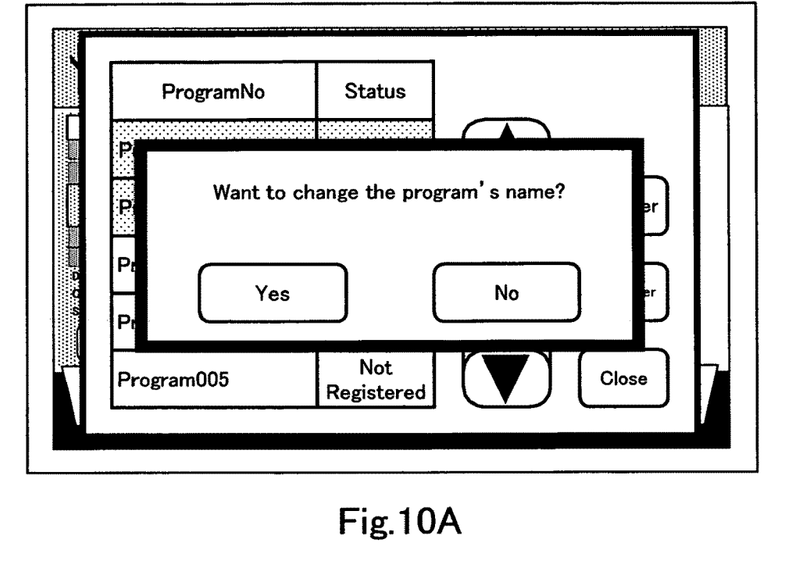
FIG. 10A is a diagram for illustrating an operation display that appears on the screen during program information registration according to another embodiment.
Figure 10B:
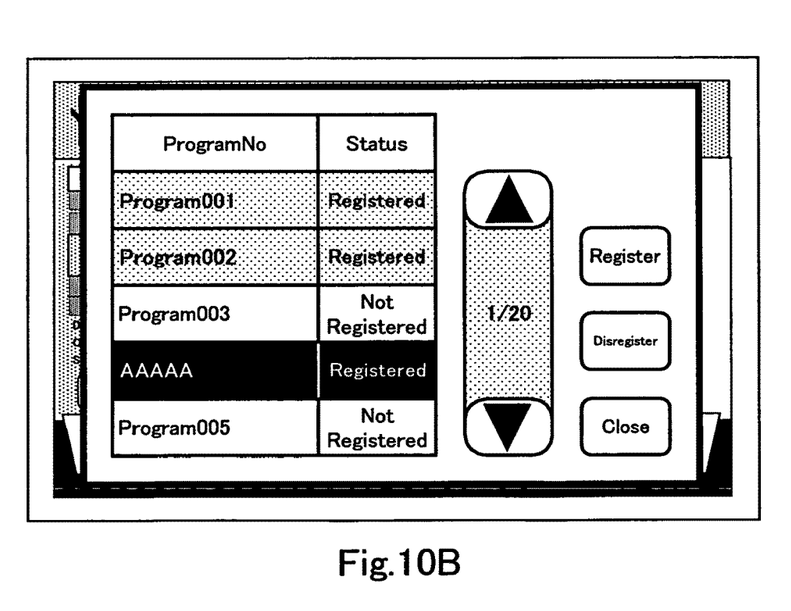
FIG. 10B is a diagram for illustrating an operation display that appears on the screen during program information registration according to another embodiment.

While in the above embodiment the pieces of program information stored in the program memory portion 57 are imparted "Program Nos." ranging from "001" to "100" prepared in advance, the program registration processing portion 51 may show, during registration of a piece of program information, a display on the screen asking the operator whether to impart the piece of program information an optional name instead of a "Program No.," and in the affirmative, impart the piece of program information a name desired by the operator, as shown in FIGS. 10A and 10B.

Utilizing this embodiment of the present invention enables the operator to easily select the desired piece of program information even if the names imparted to the plurality of pieces of program information stored in the program memory portion 57 resemble each other.

While in the above embodiment the program memory portion of the present invention is constituted of the flash ROM 20f disposed in the operating control portion 20, this should not be construed in a limiting sense. For example, the memory portion 15 connected to the communication bus or any other memory media is possible insofar as the stored program information will not be erased when the color multifunction photocopier 100 is turned off. This eliminates the cost of disposing the flash ROM 20f in the operating control portion 20.

While in the above embodiment the image processing device according to the present invention has been described by referring to the color multifunction photocopier 100, this should not be construed in a limiting sense. It will be readily appreciated that the present invention will find applications in any other image processing devices insofar as the desired operational mode can be registered as program information.

The above embodiments have been described by way of example and will not limit the present invention; it will be appreciated that various modifications can be made to the specific details of the constituent parts of the present invention without departing from the scope of the present invention.

What is claimed is:

1. An image processing device having an operating portion for storing and recalling a programmed procedure, the operating portion comprising:
    a display portion on which a plurality of operation displays are shown;
    a plurality of operation keys for facilitating operation inputs;
    an operating control portion comprising a processor and program memory for controlling operations and the plurality of operation displays, the operating control portion further comprising program portions, stored in the program memory and executed by the processor, comprising:
    a mode selection processing portion that selects a desired combination of operational modes from a plurality of operational modes based upon inputs from among the plurality of operation keys;
    a program registration processing portion for registering a programmed procedure and storing in a portion of the program memory an identification for the programmed procedure, the programmed procedure corresponding to the selected combination of operational modes selected by the mode selection processing portion;
    a program selection processing portion capable of selecting a desired programmed procedure from among a plurality of programmed procedures stored in the program memory portion, wherein the selection of the desired programmed procedure is based upon an operator selection from among choices of programmed procedures shown on the display portion;
    a program call processing portion for setting operational modes of the image processing device based upon the identification of the selected programmed procedure; and
    a program search processing portion for searching among programmed procedures stored in the program memory portion based on search key information corresponding to an individual operational mode or a desired combination of operational modes;
    wherein the program search processing portion comprises a search key information setting portion for displaying a search key, allowing the programmed procedure to be selected, for creating an optional piece of search key information corresponding to one of the operational modes;
    wherein the program selection processing portion comprises a program list display processing portion for displaying an identification list of the programmed procedures stored in the program memory portion, the displayed identification list allowing the programmed procedure to be selected therefrom, and narrowing down the list with further search key operations to display only programmed procedures which include operational modes corresponding to the above selected search key; and
    wherein the search key and identification list appear on the same operation display.

2. The image processing device of claim 1, wherein the program search processing portion comprises a search key information setting portion for setting the search key information to correspond to one operational mode.

3. The image processing device of claim 1, wherein the program selection processing portion comprises a program list display processing portion for displaying a list of identifications respectively corresponding to the programmed procedures stored in the program memory portion, the program list allowing selection of a programmed procedure therefrom, wherein the displayed program list may be selected to correspond to a subset of programmed procedures as determined by a result of the program search processing portion, wherein selection of the programmed procedure may be from the subset.

4. The image processing system of claim 1, wherein the program registration processing portion stores in a portion of the program memory said identification and a set of parameters for the programmed procedure, the set of parameters corresponding to the selected combination of operational modes selected by the mode selection processing portion; wherein each parameter corresponds to a single function capable of being implemented by the image processing device as a unit of setting; and wherein a portion of said search key information corresponding to an operational mode is set according to said unit of setting.

5. An image processing device having an operating portion for storing and recalling a programmed procedure, the operating portion comprising:
  a display portion on which a plurality of operation displays are shown;
  a plurality of operation keys for facilitating operation inputs;
  an operating control portion comprising a processor and program memory for controlling operations and the plurality of operation displays, the operating control portion further comprising program portions, stored in the program memory and executed by the processor, comprising:
  a mode selection processing portion that selects a desired combination of operational modes from a plurality of operational modes based upon inputs from among the plurality of operation keys;
  a program registration processing portion for registering a programmed procedure and storing in a portion of the program memory an identification for the programmed procedure, the programmed procedure corresponding to the selected combination of operational modes selected by the mode selection processing portion;
  a program selection processing portion capable of selecting a desired programmed procedure from among a plurality of programmed procedures stored in the program memory portion, wherein the selection of the desired programmed procedure is based upon an operator selection from among choices of programmed procedures shown on the display portion;
  a program call processing portion for setting operational modes of the image processing device based upon the identification of the selected programmed procedure; and
  a program search processing portion for searching among programmed procedures stored in the program memory portion based on search key information corresponding to an individual operational mode or a desired combination of operational modes;
  wherein the program search processing portion comprises a search key information setting portion for concurrently displaying a plurality of search keys, wherein selection of a search key among the plurality of concurrently displayed search keys creates an optional piece of search key information corresponding to one of the operational modes;
  wherein the program selection processing portion comprises a program list display processing portion for displaying an identification list of the programmed procedures stored in the program memory portion, the displayed identification list allowing the programmed procedure to be selected therefrom, and narrowing down the list with further search key operations to display only programmed procedures which include operational modes corresponding to the above selected search key; and
  wherein the plurality of concurrently displayed search keys, including the selected search key, and the narrowed identification list appear on the same operation display.

* * * * *